United States Patent
Dissett et al.

(10) Patent No.: US 7,599,966 B2
(45) Date of Patent: Oct. 6, 2009

(54) SYSTEM AND METHOD FOR IMPROVING ONLINE SEARCH ENGINE RESULTS

(75) Inventors: Daniel Patrick Dissett, San Francisco, CA (US); Arkady Borkovsky, San Francisco, CA (US); Charles Converse Carson, Jr., San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 298 days.

(21) Appl. No.: 11/046,501

(22) Filed: Jan. 28, 2005

(65) Prior Publication Data

US 2006/0167852 A1 Jul. 27, 2006

Related U.S. Application Data

(60) Provisional application No. 60/647,859, filed on Jan. 27, 2005.

(51) Int. Cl.
*G06F 17/30* (2006.01)
(52) U.S. Cl. .................. 707/200; 707/203; 709/213
(58) Field of Classification Search ................ 707/100, 707/3, 1, 200, 4, 203; 715/501; 711/133; 709/246, 207, 213; 705/37
See application file for complete search history.

(56) References Cited

U.S. PATENT DOCUMENTS

| | | | |
|---|---|---|---|
| 6,542,964 B1 * | 4/2003 | Scharber | 711/122 |
| 6,959,326 B1 * | 10/2005 | Day et al. | 709/217 |
| 7,096,418 B1 * | 8/2006 | Singhal et al. | 715/501.1 |
| 7,284,035 B2 * | 10/2007 | Yu et al. | 709/207 |
| 2002/0107934 A1 * | 8/2002 | Lowery et al. | 709/213 |
| 2002/0165986 A1 * | 11/2002 | Tarnoff | 709/246 |
| 2003/0046311 A1 * | 3/2003 | Baidya et al. | 707/200 |
| 2003/0097417 A1 * | 5/2003 | Lin et al. | 709/213 |
| 2003/0120875 A1 * | 6/2003 | Bourne et al. | 711/144 |
| 2004/0186826 A1 * | 9/2004 | Choi et al. | 707/3 |
| 2005/0015394 A1 * | 1/2005 | McKeeth | 707/100 |
| 2005/0125626 A1 * | 6/2005 | Todd | 711/202 |
| 2005/0208929 A1 * | 9/2005 | Zmrzli | 455/414.2 |
| 2005/0283457 A1 * | 12/2005 | Sonkin et al. | 707/1 |
| 2006/0100956 A1 * | 5/2006 | Ryan et al. | 705/37 |
| 2006/0136383 A1 * | 6/2006 | Golla | 707/3 |

* cited by examiner

*Primary Examiner*—Luke S. Wassum
*Assistant Examiner*—Sherief Badawi
(74) *Attorney, Agent, or Firm*—Seth H. Ostrow; Ostrow Kaufman & Frankl LLP

(57) ABSTRACT

System and method for improving online search engine results. In one embodiment, a search system queries one or more servers of a destination site to obtain detailed and relevant information. In one embodiment, this query is in the form of an application programming interface call. Based on the content received in response to the aforementioned queries, a plurality of content pages may then be used to build one or more search databases against which user searches may be made during some future time period.

18 Claims, 8 Drawing Sheets

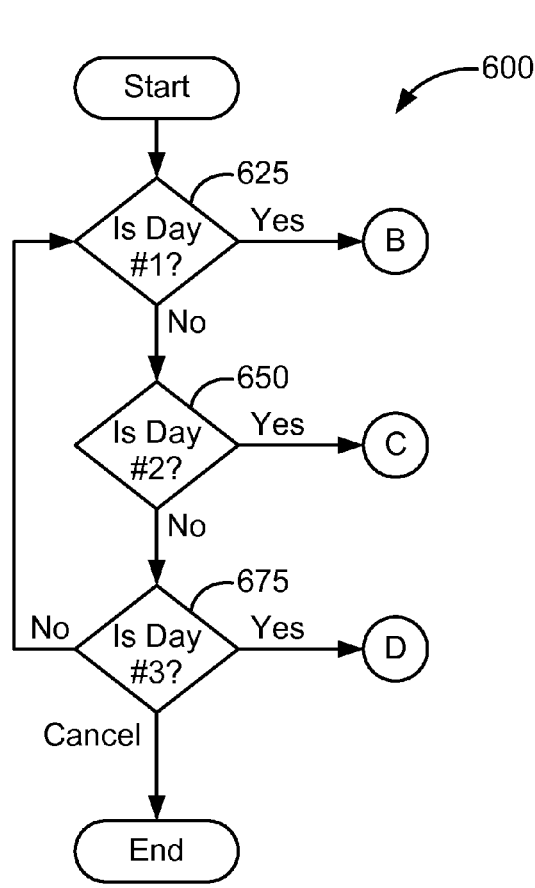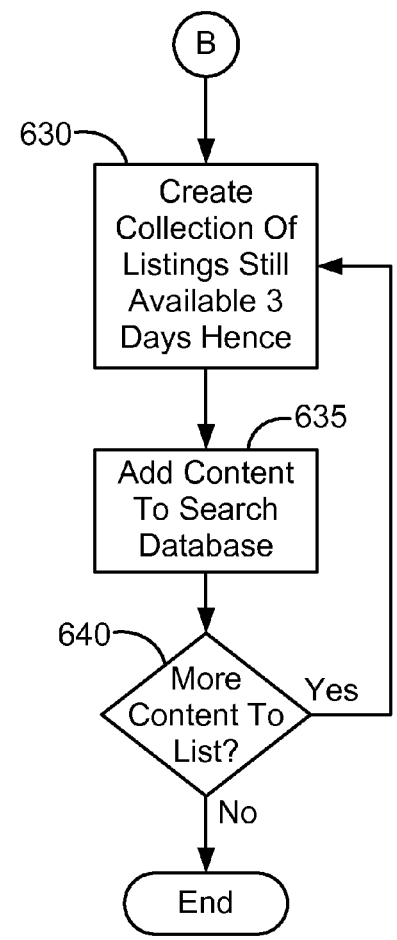
FIG. 6A
FIG. 6B

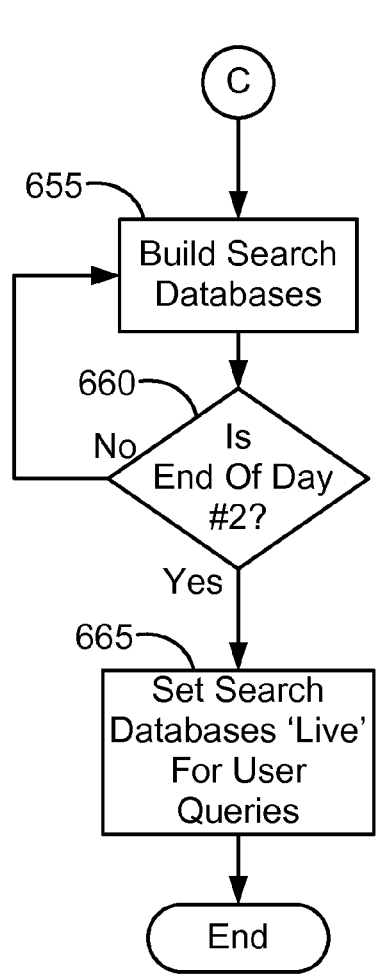 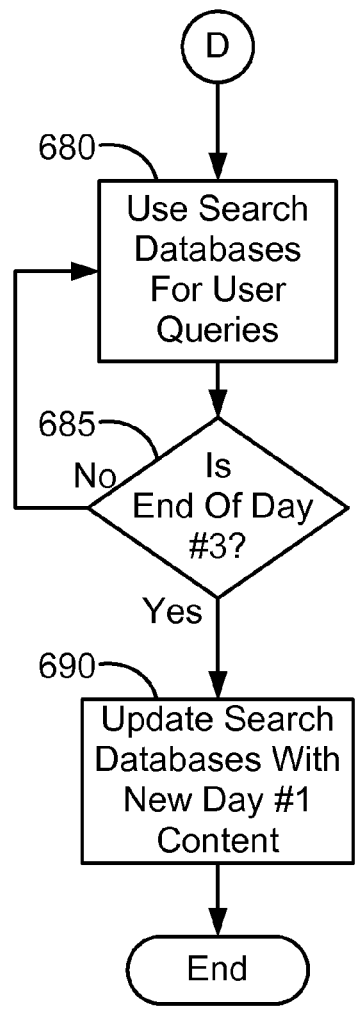
FIG. 6C  FIG. 6D

SYSTEM AND METHOD FOR IMPROVING ONLINE SEARCH ENGINE RESULTS

CROSS-REFERENCE TO RELATED APPLICATION

This application claims benefit of U.S. Provisional Application No. 60/647,859 filed on Jan. 27, 2005.

FIELD OF THE INVENTION

This invention relates generally to online content searching and management, and in particular to improving online search engine results for online resources containing dynamic content.

BACKGROUND OF THE INVENTION

Online content providers are increasingly moving towards building World Wide Web sites which are more reliant on dynamic, frequently-updated content. Content continues to be made available more and more via online auction sites, stock market information sites, news and weather sites, or any other such site whose information changes on a frequent basis, oftentimes daily.

Major search engines however, which enable Internet users to search for information on the World Wide Web, create search databases of information which rely on pages being static instead of dynamic. To create these databases, the search engine does what is known as "crawling" web sites by retrieving the content of a given Web page and storing it for later use. However, if the Web page is removed or changed even once in the several-weeks period between successive crawls, the search engine will display outdated or irrelevant information to the search engine user.

At a very high level, search engines download pages from Web sites and then build databases that index the content of these pages. These databases are then consulted when processing search requests to find the pages relevant to the query. There is a substantial delay from when a page is downloaded to when it is included in a database for processing queries. This delay is usually on the order of several days to several weeks. Many of the Web pages of, e.g., an online auction site such as eBay consist of a list of listings (frequently auctions) combined with navigational links and other information. Some pages of online auction sites display listings that meet some search criteria (search pages), others show items that are in a given category (category pages) or that are available for purchase from one auction site user's store (store pages). By default, those listings ending soon appear at the top of the list.

Many online auction site listings are auctions that last for three to ten days. In addition, some listings include an option that ends the listing immediately. It is not uncommon for a listings page to include items that all end in the next 24 hours. This means that online auction site pages included in a search engine usually contain titles from auctions that have already expired.

Because indexed online auction site pages become out of date very quickly, search engines cannot accurately match queries against such pages. The text matched against a user's query is likely to be from auctions that are no longer available. Therefore, the page is not relevant to the user's query unless new similar listings are available when the user clicks on the search result.

There are several ways search engines have addressed these issues. One option has been to exclude pages containing dynamic content from the search results. Another has been to treat pages containing dynamic content like any other web page. This results in the issues described above. Finally, in the case of auction sites, another option has been not to include auction titles in the text indexed in the search database.

Matching outdated, e.g, eBay listings pages to search queries can erode search user trust. The relevance problem that occurs when a query matches the title of an expired listing contributes to this. Returning irrelevant web pages in search results will cause search users to trust our results less and possibly switch to other search providers.

The problem is worse when a search engine displays titles of expired listings in a search result abstract. If this listing title catches a searcher's interest, it is likely that he or she will click through (i.e., click on the search result to go to a content page referenced by the search result) and not find the listing we claimed was available in our search result abstract. Thus, there is a need for a system and method which overcomes one or more of the aforementioned drawbacks.

SUMMARY OF THE INVENTION

System and method for improving online search engine results. In one embodiment, a method includes querying a destination server for updated content where the destination server includes a content database, and receiving, in response to the querying, updated content from the content database. The method further includes building one or more search databases based at least in part on the updated content, and responding to a plurality of user queries using the one or more search databases.

Other aspects, features, and techniques of the invention will be apparent to one skilled in the relevant art in view of the following detailed description of the invention.

BRIEF DESCRIPTION OF THE DRAWINGS

FIGS. 6(A)-6(D) depict flow diagrams for one embodiment of a process for how online search engine results may be improved in accordance with the invention.

DETAILED DESCRIPTION OF THE EXEMPLARY EMBODIMENTS

Figure 1:
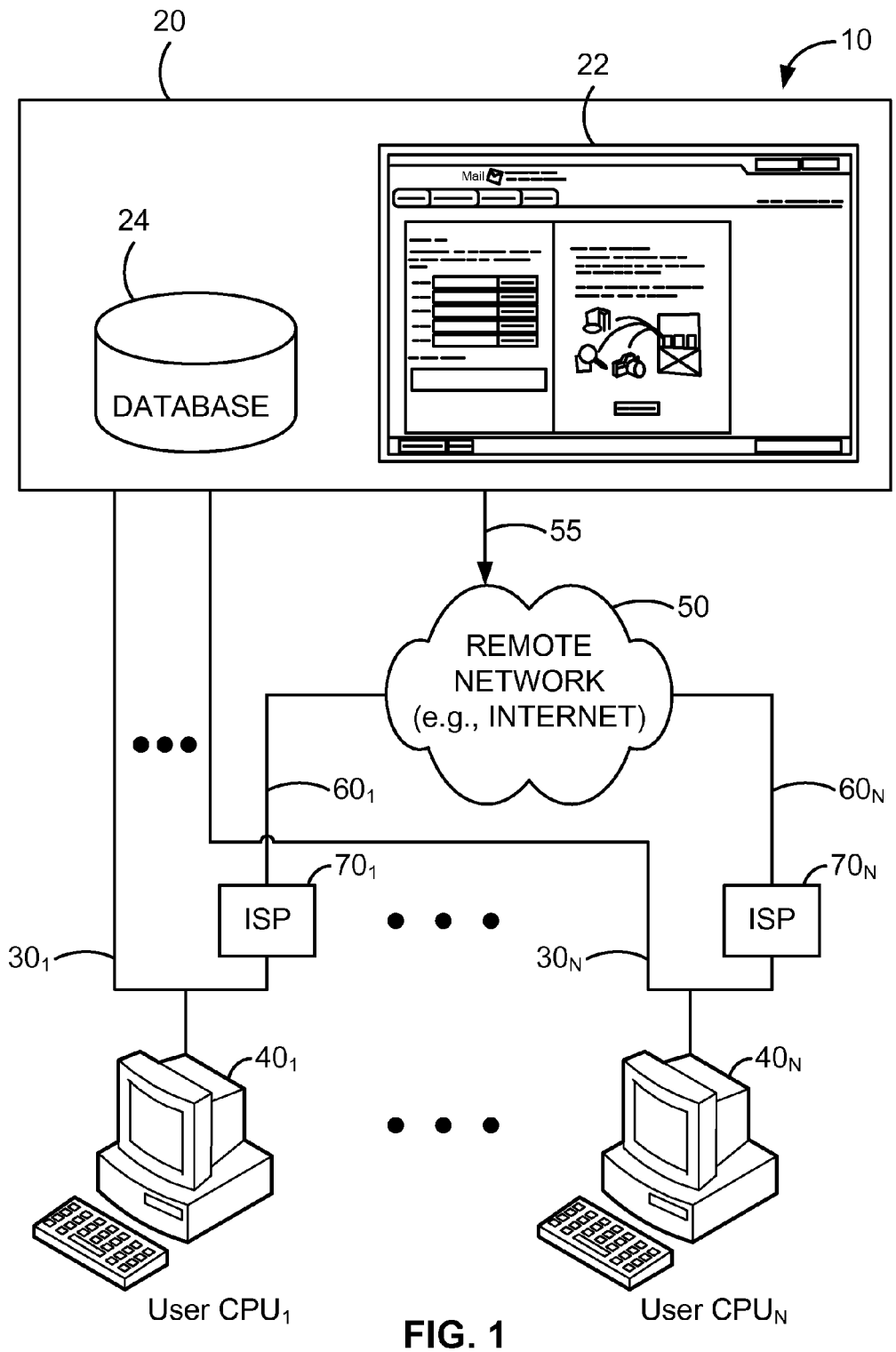
FIG. 1 depicts one embodiment of a system level diagram showing the interconnectivity of one or more aspects of the invention.

One aspect of the invention relates to providing fresh and relevant search results when the content to be searched includes dynamic content. In one embodiment, such content may be provided by a site on the World Wide Web, whose content changes on a frequent, and regular, basis (e.g., job listing site, news site personals, or online auction site). In one embodiment, a search system (e.g., search engine) queries one or more servers of a destination site (also referred to as a "content site") to obtain detailed and relevant information immediately from the destination server(s) itself, rather than from the destination site's dynamic Web pages (e.g., Web pages which are first generated by the server and then sent to users upon request). In one embodiment, this query is in the form of an application programming interface (API) call of the destination site. In one embodiment, the information/content received from the destination site is comprised of a plurality of dynamic listings.

Based on the content received in response to the aforementioned queries, another aspect of the invention is to create a plurality of content pages which may then be used to build, at least in part, one or more search databases against which user searches may be made during some future time period. In one embodiment, these content pages may be Web pages that resemble the pages to be served by the content site (i.e., the destination site) itself. These generated pages may then be indexed by the search database.

Another aspect of the invention is to follow a search database update cycle to maximize the relevancy and accuracy of search result listings for content sites containing dynamic content. In one embodiment, a 3-stage update cycle is used although more or fewer stages may similarly be used. In another embodiment, each stage is equal to approximately one day. However, it should similarly be appreciated that each stage may be longer or shorter. In still another embodiment, the nature of the content/listings may determine the length of the update cycle and/or the length of each stage of the update cycle. For example, listings from auction sites may require a shorter update cycle to maintain accuracy, while content relating to personal ads may be placed on a longer update cycle (e.g., 30 days).

Another aspect of the invention is to decouple the fetching of content from the content site from the refreshing of search engine content. The process of obtaining the content to be searched and the process of updating the search engine databases with references to that content can occur independently of one another. In other words, the update cycle to be used by the search engine need not be related to the content site's update practices. This enables the search system to use update cycles which are best suited for particular types of content or listings, as well as reduce the number of queries required to maintain fresh and relevant content.

As previously mentioned, a search engine server may send a query (e.g., an API call) to the destination site's server. In response, the destination site's server may provide content (e.g., listings) responsive to the query. During the first stage of the exemplary 3-stage update cycle, a collection of content or listings which will still available from the particular destination site during the last stage of the update cycle (e.g., the third stage) may then be identified. In one embodiment, this collection of content may then be used to generate a plurality of pages containing dynamic listings which will be available on the destination site during the third stage of the 3-stage update cycle. In another embodiment, the plurality of content pages may be shadow Web pages made to resemble a corresponding page that is to be served by the destination site itself.

Once created, these content pages may be used to build, at least in part, a plurality of search databases during the second stage of the exemplary 3-stage update cycle. In one embodiment, the plurality of search databases are built using the created content pages, as well as content from other sources. In one embodiment, each content page may be identified with a key, which may be a search string, category ID, store name, or any other identifier. This key may then be used to periodically update its associated content page. For example, when the search system determines that a particular content page should be updated, a query (e.g., API call) containing that particular page's key may be sent to the destination site. In this fashion, the search system is able to update only pre-select content pages. This may be desirable to minimize the number of queries needed to maintain the relevancy and accuracy of the search database's content. For example, the search system may prioritize which listings are in the most need of being updated. Using the associated keys for these identified listings, the search system may query the destination site for only those particular listings, rather than having to update all of the listings for a given destination site.

Thereafter, during stage three of the exemplary 3-stage update cycle, the search engine may serve user search queries using the plurality of search databases built during stage 2. In one embodiment, the user search queries may be submitted to the search database by entering one or more search terms into a search engine's graphical user interface.

Referring now to the drawings, FIG. 1 shows a system block diagram of one embodiment of an information distribution system 10 in which the system and method of the invention may be used. In the embodiment of FIG. 1, system 10 comprises a remote server 20 that may be connected over one or more communications links $30_1$-$30_N$ ("30") to one or more user computer systems $40_1$-$40_N$ ("40"). The remote server 20 may include computer readable instructions for generating and displaying one or target websites 22 to the user computers 40. In one embodiment, the remote server 20 may further include one or more databases 24 for storing data such as, for example, user data and/or target website 22 data. While for brevity remote server 20 is referred to in the singular, it should equally be appreciated that remote server 20 may be comprised of a plurality of individual computers or servers.

Remote server 20 may further be connected to a remote network 50 (e.g., the Internet) or a remote site (e.g., a satellite, which is not shown in FIG. 1) via communication link 55. The remote network 50 or remote site may be used to allow the remote server 20 to provide a wider variety of computer software, content, etc. to the one or more user computers 40. In addition, user computers 40 may be coupled to the remote network via communication link $60_1$-$60_N$ and internet service provider (ISP) $70_1$-$70_N$.

Figure 2:
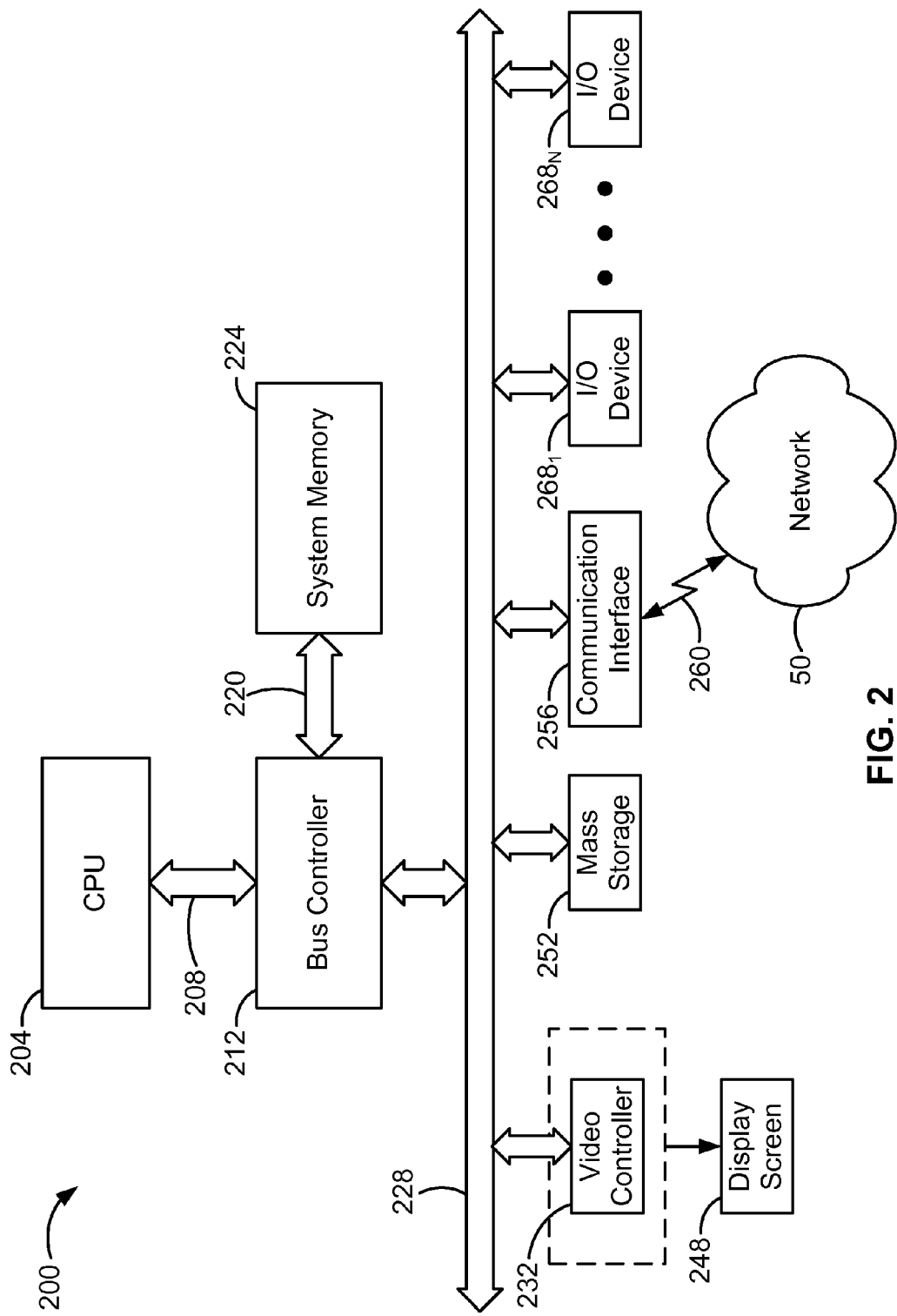
FIG. 2 depicts one embodiment of a system level diagram of a computer system consistent with the principles of the invention.

Referring to FIG. 2, depicted is one embodiment of the type of computer system which may comprise the one or more user computers 40 of FIG. 1. In particular, computer system 200 comprises a processor or a central processing unit (CPU) 204, which may include an arithmetic logic unit (ALU) for performing computations, a collection of registers for temporary storage of data and instructions, and a control unit for controlling operation for the system 200. In one embodiment, the CPU 234 includes any one of the x86, Pentium™ class microprocessors as marketed by Intel™ Corporation, microprocessors as marketed by AMD™, or the 6×86MX microprocessor as marketed by Cyrix™ Corp. In addition, any of a variety of other processors, including those from Sun Microsystems, MIPS, IBM, Motorola, NEC, Cyrix, AMD, Nexgen and others may be used for implementing CPU 204. Moreover, the CPU 204 is not limited to microprocessors but may take on other forms such as microcontrollers, digital signal processors, reduced instruction set computers (RISC), application specific integrated circuits, and the like. Although shown with one CPU 204, it should equally be appreciated that computer system 200 may alternatively include multiple processing units.

The CPU 204 is coupled to a bus controller 212 by way of a CPU bus 208. The bus controller 212 may include a memory controller integrated therein, although the memory controller may be external to the bus controller 212. In one embodiment, the system memory 224 may be coupled to the bus control 212 via a memory bus 220, where the system memory 224 may include synchronous dynamic random access memory (SDRAM). System memory 124 may optionally include any additional or alternative high speed memory device or memory circuitry. The bus controller 212 is coupled to a system bus 228 that may be a peripheral component interconnect (PCI) bus, Industry Standard Architecture (ISA) bus, etc. Coupled to the system bus 228 are a graphics controller, a graphics engine or a video controller 232, a mass storage device 252, a communication interface device 256, one or more input/output (I/O) devices $268_1$-$268_N$. The video controller 232 may be coupled to a video memory and video BIOS, all of which may be integrated onto a single card or device. The video memory may be used to contain display data for displaying information on the display screen 248, and the video BIOS may include code and video services for controlling the video controller 232. In another embodiment, the video controller 232 may be coupled to the CPU 204 through an advanced graphics port (AGP) bus (not shown).

The mass storage device 252 may include (but not be limited to) a hard disk, floppy disk, CD-ROM, DVD-ROM, tape, high density floppy, high capacity removable media, low capacity removable media, solid state memory device, etc., and combinations thereof. The mass storage device 252 may further include any other mass storage medium. The communication interface device 256 may include a network card, a modem interface, etc. for accessing network 50 via communications link 260. The I/O devices $268_1$-$268_N$ include a keyboard, mouse, audio/sound card, printer, and the like. The I/O device $268_1$-$268_N$ may be a disk drive, such as a compact disk drive, a digital disk drive, a tape drive, a zip drive, a jazz drive, a digital video disk (DVD) drive, a solid state memory device, a magneto-optical disk drive, a high density floppy drive, a high capacity removable drive, a low capacity media device, and/or any combination thereof.

Computer system 200 may further include system firmware, such as system BIOS, for controlling, among other things, hardware devices in the computer system 200. The system firmware may include ROM and/or flash (or EEPROM) memory.

As is familiar to those skilled in the art, the computer system 200 may further includes an operating system (OS) and at least one application program, which in one embodiment, are loaded into system memory 224 from mass storage device 252. The OS may include any type of OS including, but not limited or restricted to, DOS, Windows, Unix, Linux, Xenix, etc. The operating system is a set of one or more programs which control the computer system's 200 operation and the allocation of resources. The application program is a set of one or more software programs that performs a task desired by the user.

Figure 3:
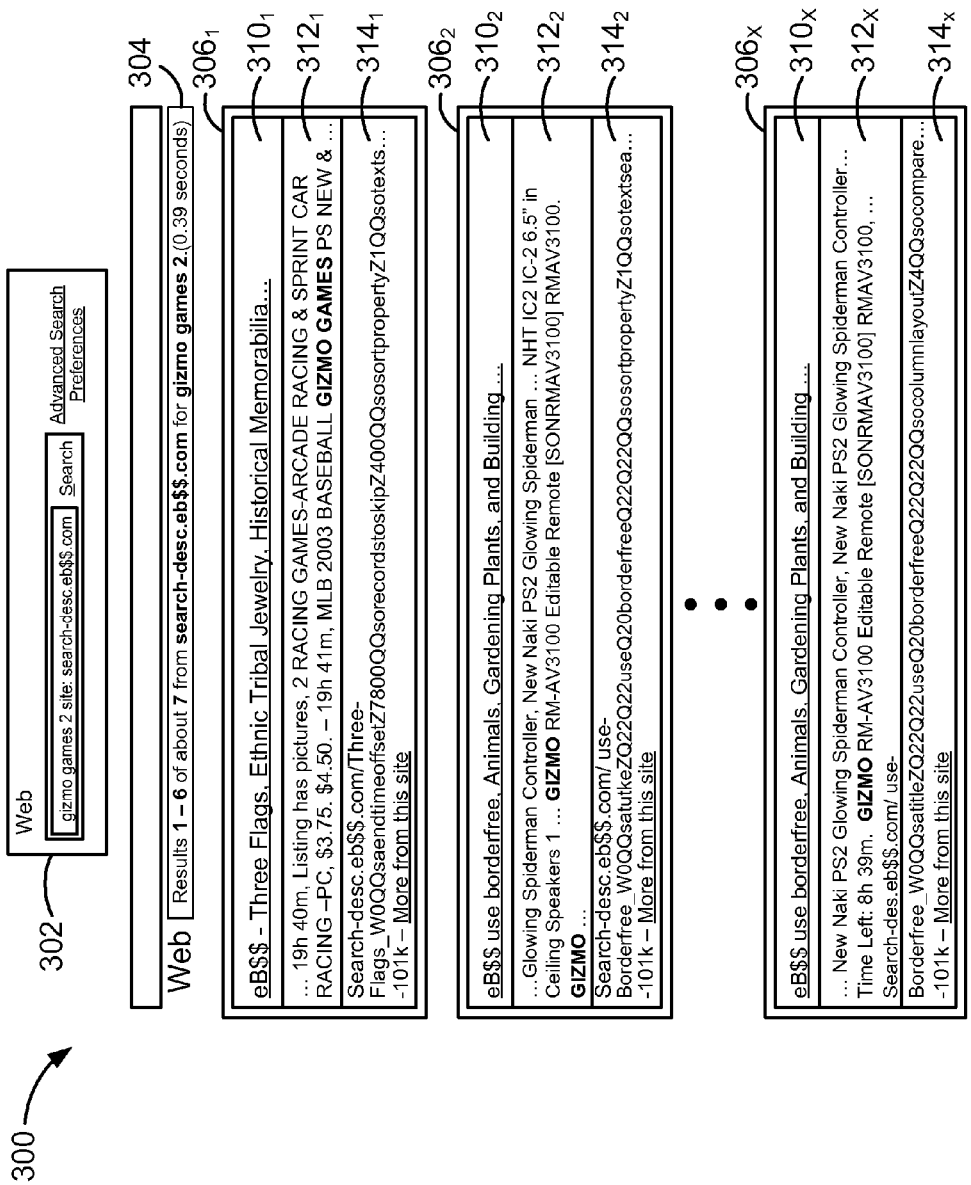
FIG. 3 depicts how a typical search results page of the prior art may look for a particular query and from, e.g., an online auction Web site.

FIG. 3 depicts a typical Web page 300 of the prior art listing search results returned by a search engine in response to a user query (e.g., entered using a graphical user interface of an online search engine). The title of the page 302 tells the user this page contains the search listings matching their query; the line 304 tells the user that the current page is presently displaying, e.g., "Results 1-6 of about 7 from search-desc.eb$$.com for gizmo games 2". The search results $306_1$, . . . , $306_x$ each contain titles $310_1$, . . . , $310_x$. A title describes in one line the title of the page pointed to by the result, or may describe the group of results found on a given page. Notice how the search query is for a gizmo games 2, yet the first title is for an irrelevant listing, e.g., Ethnic Tribal Jewelery. The search results $306_1$, . . . , $306_x$ typically also contain abstracts $312_1$, . . . , $312_x$. An abstract typically specifies details as to why the particular result matches the user's query, which may be by including portions of text from the Web page listed in the search result. Again, the search result abstracts of FIG. 3 fail to be relevant as none of them mention the full search query, "gizmo games 2." The search results $306_1$, . . . , $306_x$ also typically include URLs $314_1$, . . . , $314_x$ depicting the location on the Internet of the Web page which matches the user's query.

Figure 4:
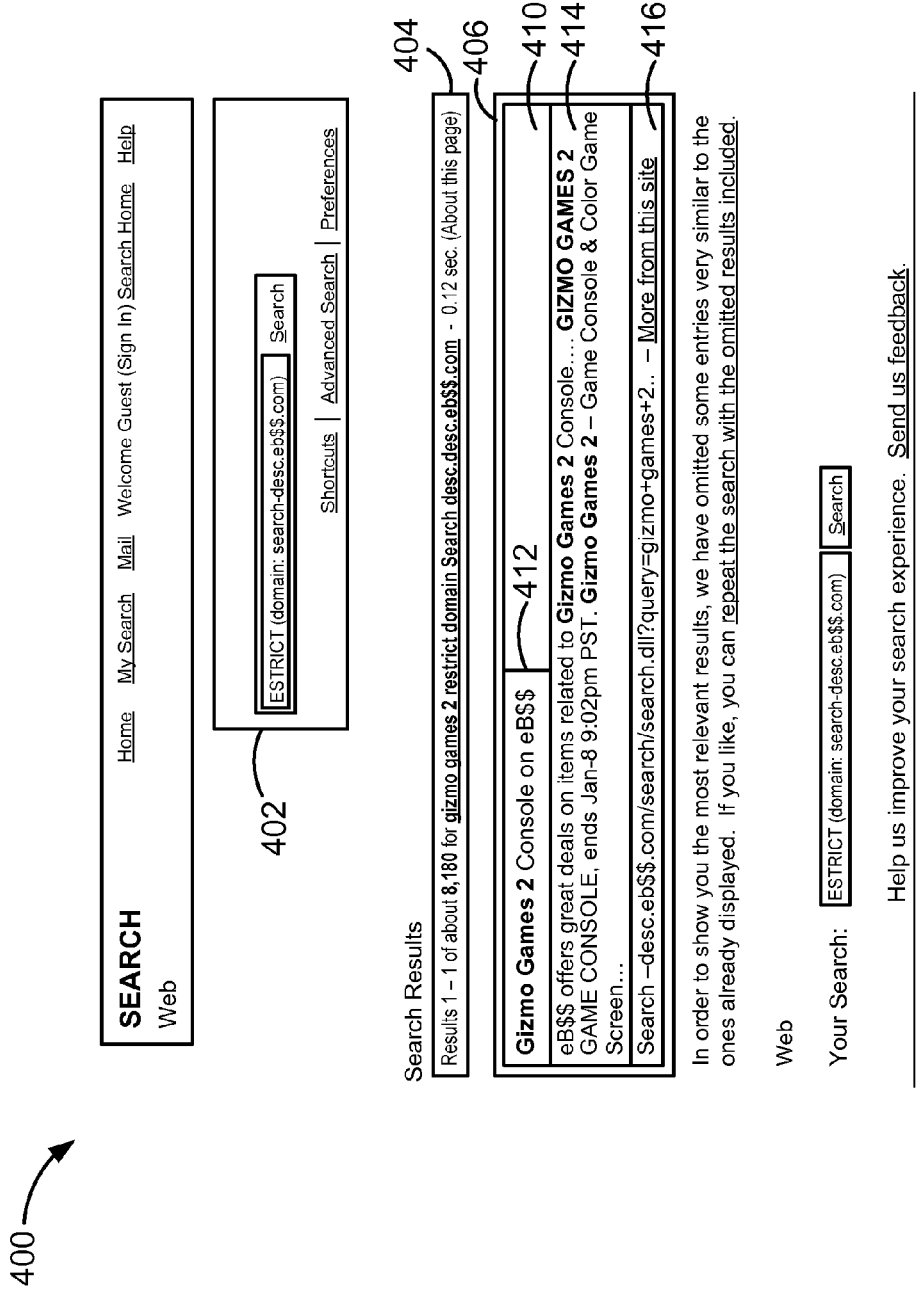
FIG. 4 depicts an embodiment of a search results page consistent with the principles of the invention.

FIG. 4 depicts an online search result page 400 consistent with the principles of the present invention listing search results returned by the search engine in response to a user query. The title of the page 402 tells the user this page contains the search listings matching their query; the line 404 tells the user that the current page is presently displaying, e.g., "Results 1-1 of about 8,180 . . . ". The search result 406 contains a title 410. In one embodiment, the search result 406 may also contain an image 412 which the user can click on with the computer mouse to open the resulting Web page in a new browser window. In the embodiment of FIG. 4, the search result 406 also contains an abstract 414 and a URL 416 depicting the location of the listing that matches the user's query. In one aspect of the invention, the abstract lists exactly the online auction site listing matching the user's query, i.e., "eB$$ offers great deals on . . . Gizmo Games 2 Console . . . GIZMO GAMES 2 CONSOLE, ends Jan-8 9:02 pm PST" when the query is "Gizmo Games 2," and the search was undertaken at 3:00 pm PST on Jan. 6, 2005. Thus, result 406 is both a relevant (matches the user's query) and a fresh (the information in the abstract is current) search result.

Figure 5A:
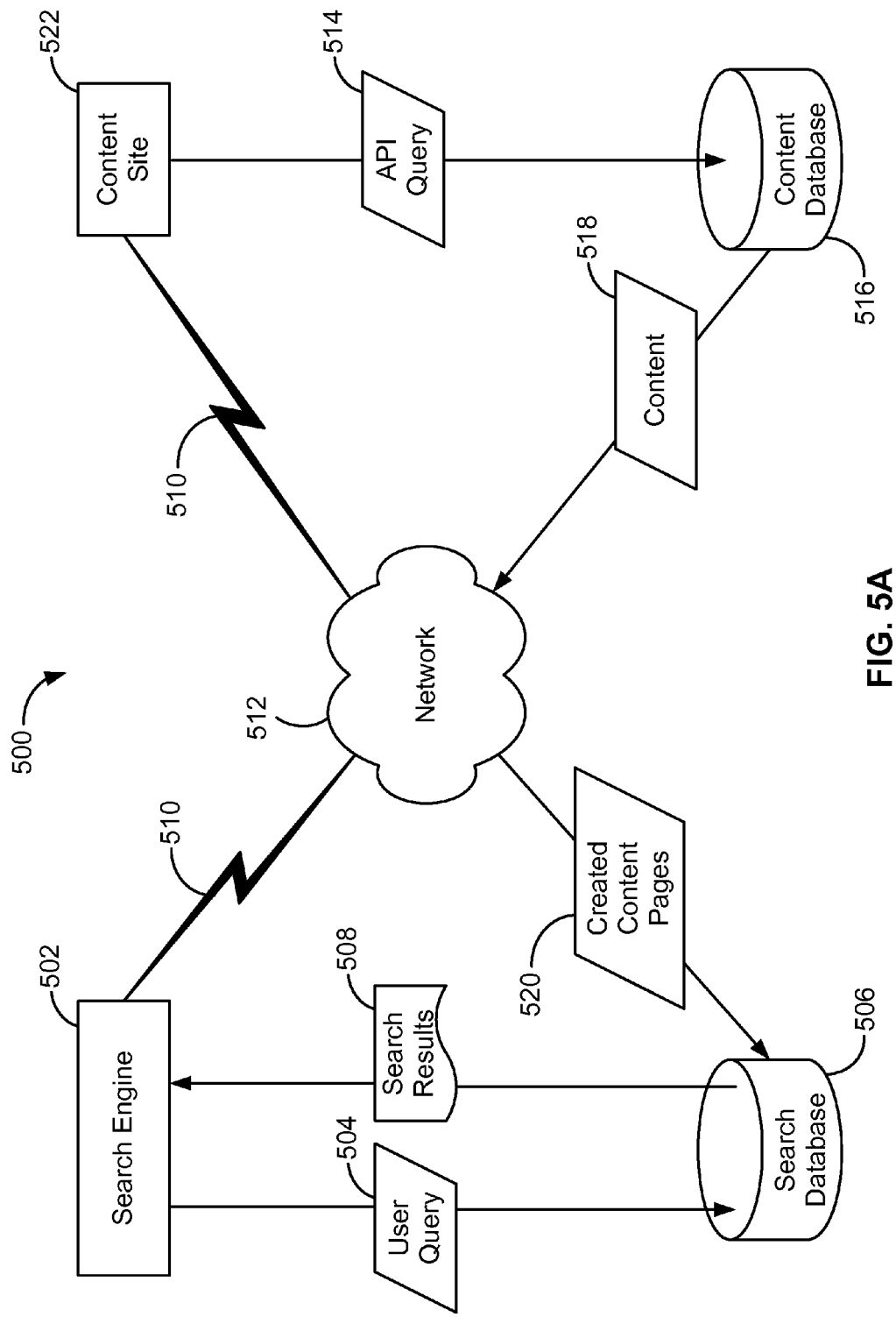
FIG. 5(A) depicts one embodiment of a system usable to implement one or more aspects of the invention.

FIG. 5(A) depicts an embodiment 500 of a system for retrieving up-to-date and real-time content information from a dynamic content server via use of the content server's public application programming interface (API). In this embodiment, the search engine server 502 normally functions by accepting user queries 504 and sending these to its search database 506, whereupon the search database 506 returns search results 508. One aspect of the invention is that the search engine 502 sends an API call 510 through the network 512. It should be noted that the network 512 may be the Internet, or private corporate internetwork, (i.e., a series of interconnected networks, e.g., a Wide-Area Network (WAN)) or a private corporate intranetwork (i.e., an intranet or Local Area Network (LAN)), or a private corporate network, such as what connects a plurality of workstations, servers, etc. to each other locally, or another communications medium over which data can flow between the search engine and a content server. The API call 510 continues to the content site's server 522, which then issues a query resulting from the specifications of the API call (i.e., an "API Query") 514 to one or more of a plurality of content databases 516. The content database 516 may then return matching listings 518 (e.g., auction listings, personals, etc.) over the network 512 where they may be used to create content pages 520 and indexed into the search database 506 of the search engine 502.

Figure 5B:
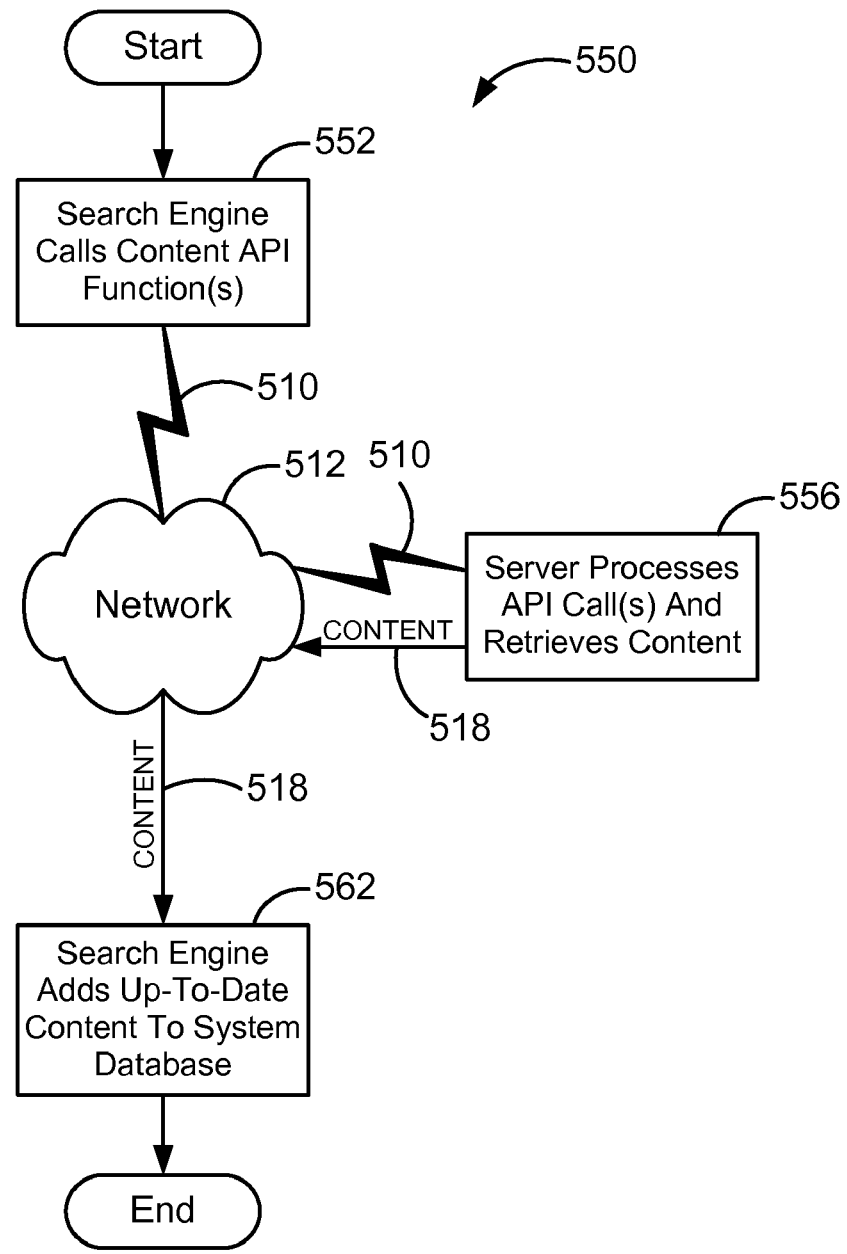
FIG. 5(B) depicts one embodiment of a process by which content may be retrieved from content servers and added to a search database of a search engine, in accordance with the principles of the invention.

FIG. 5(B) depicts one embodiment of a process 550 for retrieving content from a content site 522 to then index and include in the search database 506 of the search engine 502 from FIG. 5(A). The process 550 starts at block 552 whereupon the search engine 502 calls API functions offered by the content server 522. The API call 510 from may be made to the content server via the network 512, which then routes the call to the content server 522. In block 556 of process 550, the server processes the API call(s) made by the search engine, retrieves content 518 from its database (e.g., database 516), and then returns this content to the search engine 502 via the network 512. Thereafter, the search engine may add the up-to-date content to its search database (e.g., search database 506), whereupon process 550 ends.

FIG. 6(A) depicts an embodiment of a process 600 for determining which stage (e.g., Day #1, Day #2, or Day #3) of an exemplary 3-day update cycle to use for distributing content to a search database and serving user queries. While FIGS. 6(A)-6(B) are described in terms of a 3-stage update cycle with each stage equally one day, it should equally be appreciated that the number of stages in the update cycle, as well as the length thereof, may similarly be more or less than the specific embodiments of FIGS. 6(A)-6(B).

Process 600 begins at block 625 whereupon the process 600 determines whether the current stage of the update cycle is Stage 1, which in this embodiment is Day #1. If this is so, then process 600 continues to FIG. 6(B). If not, then process 600 continues to block 650, whereupon the process 600 determines whether today is Day #2 (which is Stage 2). If this is so, then process 600 continues to FIG. 6(C). If not, then process 600 continues to block 675, whereupon the process 600 determines whether today is Day #3. If this is so, then process 600 continues to FIG. 6(D). If not, then process 600 repeats to block 625, unless a 'Cancel' signal is given to the process, whereupon process 600 interrupts itself and ends. Moreover, it should be appreciated that multiple versions of process 600 may be running at the same time such that, on any given day, one process may be in Stage 1, another process will be in Stage 2, and a third process will be in Stage 3. This will ensure that new search databases are continuously being updated with fresh content.

Referring now to where process 600 continues in FIG. 6(B), the process first moves to block 630 at which point the search engine (e.g., search engine 502) creates a collection of listings which will still available from the content site (e.g., content site 522) in 3 days from the point at which block 630 runs. In one embodiment, this collection of listings may be created using the dynamic listings/content received from the content site' server (e.g., content database 516) in response to one or more content queries (e.g., API calls 510), as previously described with reference to FIGS. 5(A)-5(B). In another embodiment, this collection of listings may be in the form of a plurality of content pages, which may resemble the pages to be served by the content site itself. These generated pages may then be indexed by the search database.

Process 600 then proceeds to block 635, whereupon the content (e.g., content pages) created in block 630 may optionally be added to the search database in a piecemeal fashion. In another embodiment, the created content may be used to build a plurality of new search databases, as will be described below with reference to FIG. 6(C). Process 600 proceeds to block 640 wherein the process determines whether there is more content available from which to generate listings. If yes, process 600 repeats from block 630; otherwise, the process 600 ends.

Referring now to where process 600 continues in FIG. 6(C), the process first moves to block 655 wherein the search engine (e.g., search engine 502) builds a plurality of search databases from the content retrieved in block 630 of FIG. 6(B). It should be appreciated that the plurality of search databases may also be built with a combination of the content retrieved in block 630 of FIG. 6(B) and content provided by other sources. Process 600 proceeds to block 660 wherein the process may determine whether the current time is the end of Day #2 (which is the end of the second stage). If not, process 600 repeats from block 655; otherwise, the process 600 proceeds to block 665, whereupon the process sets the plurality of search databases built in block 655 'live'; meaning that the newly built plurality of search databases will be used when users query for a particular listing. Once this is done, process 600 ends.

Referring now to where process 600 continues in FIG. 6(D), the process first moves to block 680 wherein the search engine (e.g., search engine 502) continues to use the newly built plurality of search databases for user queries of listings, as in block 665 of FIG. 6(C). Process 600 proceeds to block 685 wherein the process determines whether the current time is the end of Day #3. If not, process 600 repeats from block 680; otherwise, the process 600 proceeds to block 690, whereupon the process updates the plurality of search databases built in block 655 with 'fresh' content created in Day #1, i.e. in block 630 in FIG. 6(B). Once this is done, process 600 ends. The update cycle of FIGS. 6(A)-6(D) may then be repeated.

As previously mentioned, the update cycle to be used by the search engine need not be related to the content site's update practices. Thus, in one embodiment, the search system uses update cycles based on the particular type of content or listings, rather than on the update practices of the content site. In addition, content updating may be prioritized to have only the oldest or most dynamic content updated first. Thus, the search system may process a number of update cycles of varying lengths for different types of content and/or destination sites. In one embodiment, this may be done using a key or other identifier associated with a particular content page/listing. This key, which may be a search string, category ID, store name, or any other identifier, may be used to periodically update its associated content page. For example, when the search system determines that a particular content page should be updated, a query (e.g., API call) containing that particular page's key may be sent to the destination site.

In still other embodiments, the presentation of search result listings may be improved by removing or editing listing titles that include, for example, poor punctuation or other gimmicks commonly used to attract one's attention to the title (e.g., such as using "L@@k" in the title). In another embodiment, static titles and/or abstracts may be used to override the boilerplate text currently used. For example, static titles and/or abstracts for a given destination site may be combined with the dynamic portion of the content received from the site.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A system comprising:
a user computer coupled to a network;
a destination server having a content database coupled to said network;
a search engine coupled to said network, said search engine to,
query said destination server for dynamically generated content items via an Application Programming Interface (API),
receive, in response to said query, said dynamically generated content items from said content database, said dynamically generated content items comprising one or more dynamic listings, each of the dynamically generated content items being updated according to an associated item update cycle;

build one or more search databases based at least in part on said dynamically generated content items, wherein said dynamic listings are usable to generate one or more associated content pages for each of said dynamically generated content items, compute a frequency for each of said associated item update cycles to determine a most dynamic content item, prioritize refreshing the most dynamic content item, associate a second update cycle with said dynamic listings based on content type, the second update cycle being decoupled from the frequency for each of said associated item update cycles, and respond to a plurality of user queries using said one or more search databases.

2. The system of claim 1, wherein said destination server is a World Wide Web site server that maintains dynamic content in said content database.

3. The system of claim 1, wherein said search engine is an online search engine server accessible by said user computer using a browser application.

4. The system of claim 1, wherein said plurality of associated content pages are representative of future content pages to be served by said destination sever.

5. The system of claim 1, wherein said search engine responds to said plurality of user queries by presenting search results responsive to each of said plurality of user queries.

6. The system of claim 1, wherein said search engine is to, query said destination site server for updated dynamically generated content items during a first stage of an update cycle, build said one or more search databases during a second stage of said update cycle, and respond said plurality of user queries using said one or more search databases during a third stage of said update cycle.

7. A method comprising:

querying a destination server for updated dynamically generated content items via an Application Program Interface (API), said API operative to retrieve a plurality of dynamically generated content items corresponding to said updated content, said destination server including a content database;

receiving, in response to said querying, said updated dynamically generated content items from said content database; said dynamically generated content items comprising one or more dynamic listings, each of the dynamically generated content items being updated according to an associated item update cycle, building one or more search databases based at least in part on said dynamically generated content items, wherein said dynamic listings are usable to generate one or more associated content pages for each of said dynamically generated content items, computing a frequency for each of said associated item update cycles to determine a most dynamic content item, prioritizing refresh for the most dynamic content item, associating a second update cycle with said dynamic listings based on content type, the second update cycle being decoupled from the frequency for each of said associated item update cycles, and responding to a plurality of user queries using said one or more search databases.

8. The method of claim 7, wherein said destination server is a World Wide Web site server that maintains dynamic content in said content database.

9. The method of claim 7, wherein said responding to the plurality of user queries comprises presenting, by a search engine, search results responsive to each of said plurality of user queries.

10. The method of claim 7, wherein said plurality of dynamic content pages are representative of future content pages to be served by said destination server.

11. The method of claim 7, wherein responding to the plurality of user queries comprises responding to the plurality of user queries using said one or more search databases by presenting search results responsive to each of said plurality of user queries.

12. The method of claim 7, wherein said querying the destination server comprises querying the destination server for said dynamically generated content items during a first stage of an update cycle, and wherein said building the one or more search databases comprises building said one or more search databases during a second stage of said update cycle, and wherein said responding to the plurality of user queries comprises responding to said plurality of user queries using said one or more search databases during a third stage of said update cycle.

13. A computer program product comprising computer readable program code for execution by a programmable processor that instructs the processor to perform a method for improving online search results, the computer program product comprising:

computer readable program code to query a destination server for updated dynamically generated content items via an Application Program Interface (API), said API operative to retrieve a plurality of dynamically generated content items corresponding to said updated content, said destination server including a content database, computer readable program code to receive, in response to said computer readable program code to query, said updated dynamically generated content items from said content database, said dynamically generated content items comprising one or more dynamic listings, each of the dynamically generated content items being updated according to an associated item update cycle, computer readable program code to build one or more search databases based at least in part on said dynamically generated content items, wherein said dynamic listings are usable to generate one or more associated content pages for each of said dynamically generated content items, computer readable program code to compute a frequency for each of said associated item update cycles to determine a most dynamic content item, computer readable program code to prioritize refreshing the most dynamic content item, computer readable program code to associate a second update cycle with said dynamic listings based on content type, the second update cycle being decoupled from the frequency for each of said associated item update cycles, and computer readable program code to respond to a plurality of user queries using said one or more search databases.

14. The computer program product of claim 13 wherein said destination sever is a World Wide Web site sever that maintains dynamic content in said content database.

15. The computer program product of claim 13, wherein said computer readable program code to respond to the plurality of user queries comprises computer readable program code to present, by a search engine, search results responsive to each of said plurality of user queries.

16. The computer program product of claim 13, wherein said plurality of associated content pages are representative of future content pages to be served by said destination server.

17. The computer program product of claim 13, wherein said computer readable program code to respond to the plurality of user queries comprises computer readable program code to respond to the plurality of user queries using said one or more search databases by presenting search results responsive to each of said plurality of user queries.

18. The computer program product of claim 13, wherein said computer readable program code to query the destination server comprises computer readable program code to query the destination server for said updated content during a first stage of an update cycle, and wherein said computer readable program code to build the one or more search databases comprises computer readable program code to build said one or more search databases during a second stage of said update cycle, and wherein said computer readable program code to respond to the plurality of user queries comprises computer readable program code to respond to said plurality of user queries using said one or more search databases during a third stage of said update cycle.

* * * * *

UNITED STATES PATENT AND TRADEMARK OFFICE
CERTIFICATE OF CORRECTION

| | |
|---|---|
| PATENT NO. | : 7,599,966 B2 |
| APPLICATION NO. | : 11/046501 |
| DATED | : October 6, 2009 |
| INVENTOR(S) | : Dissett et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this

Twenty-eighth Day of September, 2010

David J. Kappos
*Director of the United States Patent and Trademark Office*